United States Patent
Lee

(10) Patent No.: US 8,638,736 B2
(45) Date of Patent: Jan. 28, 2014

(54) METHOD AND APPARATUS FOR ADAPTIVELY ALLOCATING RESOURCES IN MULTI-USER OFDM SYSTEM

(75) Inventor: Jae-Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 12/954,749

(22) Filed: Nov. 26, 2010

(65) Prior Publication Data

US 2011/0128927 A1 Jun. 2, 2011

(30) Foreign Application Priority Data

Nov. 27, 2009 (KR) .................. 10-2009-0116248

(51) Int. Cl.
*H04W 4/00* (2009.01)
*H04L 12/28* (2006.01)
*H04B 15/00* (2006.01)

(52) U.S. Cl.
USPC .......................... 370/329; 370/431; 455/522

(58) Field of Classification Search
USPC ............... 370/329, 395.4, 431, 468; 455/522
See application file for complete search history.

(56) References Cited

U.S. PATENT DOCUMENTS

| | | | |
|---|---|---|---|
| 6,732,315 B2 * | 5/2004 | Yagil et al. ................. | 714/755 |
| 7,643,423 B2 * | 1/2010 | Chillariga et al. ........... | 370/235 |
| 7,653,122 B2 * | 1/2010 | Siriwongpairat et al. ..... | 375/146 |
| 8,064,325 B1 * | 11/2011 | Cioffi et al. ................. | 370/203 |
| 8,116,780 B2 * | 2/2012 | Lee et al. ................... | 455/452.1 |
| 2004/0085909 A1 * | 5/2004 | Soliman ...................... | 370/252 |
| 2006/0063543 A1 * | 3/2006 | Matoba et al. ............... | 455/509 |
| 2007/0042786 A1 * | 2/2007 | Chillariga et al. ........... | 455/450 |
| 2007/0248121 A1 * | 10/2007 | Zou ............................ | 370/498 |
| 2007/0280130 A1 * | 12/2007 | Matsuo ........................ | 370/252 |
| 2009/0129276 A1 * | 5/2009 | Dendy ......................... | 370/236 |
| 2009/0238208 A1 * | 9/2009 | Naka ........................... | 370/470 |
| 2009/0274071 A1 * | 11/2009 | Ramesh et al. .............. | 370/277 |
| 2010/0061312 A1 * | 3/2010 | Wang et al. .................. | 370/329 |
| 2011/0194517 A1 * | 8/2011 | Nagata et al. ................ | 370/329 |

* cited by examiner

*Primary Examiner* — Ayaz Sheikh
*Assistant Examiner* — Hoang-Chuong Vu
(74) *Attorney, Agent, or Firm* — Jefferson IP Law, LLP

(57) ABSTRACT

A method and apparatus for adaptively allocating resources by a Base Station (BS) apparatus in a multi-user OFDM system is provided. The method includes receiving users' required rates and channel state information from a plurality of user terminals, setting a required inter-user transmission ratio and a number of multi-frames based on information about the users' required rates, allocating a subcarrier and transmit power to each user terminal based on the channel state information and the required inter-user transmission ratio for a period corresponding to the set number of multi-frames, and redistributing the transmit power allocated to the subcarrier. The method and apparatus can maximize the total data rate of a system while satisfying required inter-user transmission ratios in a multi-user OFDM system based on a multi-frame environment.

21 Claims, 9 Drawing Sheets

METHOD AND APPARATUS FOR ADAPTIVELY ALLOCATING RESOURCES IN MULTI-USER OFDM SYSTEM

PRIORITY

This application claims the benefit under 35 U.S.C. §119 (a) of a Korean patent application filed in the Korean Intellectual Property Office on Nov. 27, 2009 and assigned Serial No. 10-2009-0116248, the entire disclosure of which is hereby incorporated by reference.

BACKGROUND OF THE INVENTION

1. Field of the Invention

The present invention relates to a wireless communication system using Orthogonal Frequency Division Multiplexing (OFDM). More particularly, the present invention relates to a method and apparatus for adaptively allocating resources in a multi-user OFDM system.

2. Description of the Related Art

These days, many wireless communication technologies have been proposed as candidates to support high-speed mobile communication. Among them, Orthogonal Frequency Division Multiplexing (OFDM), which is a type of multicarrier modulation, has been recognized as the most promising next-generation wireless communication technology.

OFDM is a scheme of parallel-converting a serial input symbol stream and modulating the parallel-converted symbol streams with orthogonal subcarriers. The OFDM scheme may be applied to a variety of digital transmission technologies requiring high-speed data transmission, such as Wireless Internet, Digital Audio Broadcasting (DAB), Digital Multimedia Broadcasting (DMB), and Wireless Local Area Network (WLAN).

FIG. 1 is a diagram illustrating an OFDM transceiver chain according to the related art.

Referring to FIG. 1, in a transmitter chain 110 in a communication system using OFDM technology, control signals or data 111 are modulated into a series of modulation symbols by a modulator 112, and then converted from a serial signal into parallel signals by a Serial-to-Parallel (S/P) converter 113.

A subcarrier mapper 114 maps parallel signals output from the S/P converter 113 to subcarriers in a frequency domain. An Inverse Fast Fourier Transform (IFFT) unit 115 is used to transform the frequency-domain parallel signals into a plurality of time-domain OFDM symbols and provide the symbols to a Parallel-to-Serial (P/S) converter 116. A Cyclic Prefix (CP) or Zero Prefix (ZP) is added to each of OFDM symbols by a CP inserter 117 to eliminate or reduce the impact of multipath fading. The resulting signal is transmitted by a transmitting preprocessor 118 such as an antenna (not shown), or by a wire or cable.

In a receiver chain 120, if perfect time/frequency synchronization is acquired, a signal received by a receiving preprocessor 121 undergoes CP removal in a CP remover 122 and is provided to an S/P converter 123. A Fast Fourier Transform (FFT) unit 124 transforms the received signal from the time domain to the frequency domain, and the transformed signal is processed by a subcarrier demapper 125, a P/S converter 126 and a demodulator 127.

In the OFDM system, each OFDM symbol includes a plurality of subcarriers, and the subcarriers in the OFDM symbols carry modulation symbols.

FIG. 2 is a diagram illustrating an example of an OFDM transmission scheme using a first subcarrier, a second subcarrier, and a third subcarrier according to the related art. Since each OFDM symbol has finite duration in the time domain, subcarriers may overlap in the frequency domain.

As illustrated in FIG. 2, if perfect frequency synchronization is acquired in the transceiver, orthogonality may be maintained at sampling frequencies. If a frequency offset occurs due to imperfect frequency synchronization or high mobility, the orthogonality between subcarriers is destroyed at the sampling frequencies, causing Inter-Carrier Interference (ICI).

FIG. 3 is a diagram illustrating examples of OFDM symbols transmitted/received in a time domain according to the related art. Reference numeral 301 represents a transmission signal, and reference numeral 303 represents a received signal.

Because of the multipath fading, a CP part of the received signal 303 is often damaged by a previous OFDM symbol. However, if a CP is long enough, the received OFDM symbol with the CP must include only its signal convoluted by the multipath fading channel. Generally, the receiver performs FFT, for subsequent processing in the frequency domain. Compared with other transmission schemes, OFDM is advantageously robust against multipath fading. The multipath fading in the time domain is transformed into frequency-selective fading in the frequency domain. Due to the addition of the CP or ZP, Inter-Symbol Interference (ISI) between adjacent OFDM symbols is cancelled or significantly reduced. In addition, because each modulation symbol is transmitted in a narrow bandwidth, the modulation symbol experiences single-path fading. To solve the frequency-selective fading, a simple equalization scheme may be used.

In a multi-user OFDM system which allocates different subcarriers to user terminals, each of the user terminals suffers from independent fading, making it possible to obtain multi-user diversity effects. Therefore, compared with a scheme of allocating a bandwidth to a single user terminal, the multi-user OFDM system may efficiently use wireless resources.

Also, the multi-user OFDM system may maximize the total data rate of the system by being combined with schemes such as Adaptive Modulation and Coding (AMC), which employs different modulation levels and coding rates for subcarriers according to the channel states of user terminals, and Water Filling which is a transmitting power control scheme. In addition, for the multi-user OFDM system, various resource allocation methods have been proposed to maximize the total data rate of the system under several conditions such as transmit power and multipath fading. However, existing resource allocation methods still do not maximize the data rate of the communication system.

Accordingly, there is a need for a subcarrier and power allocation method for maximizing the total data rate of the system while satisfying an inter-user (or inter-user terminal) required transmission ratio in a multi-user OFDM system.

SUMMARY OF THE INVENTION

An aspect of the present invention is to address at least the above-mentioned problems and/or disadvantages and to provide at least the advantages described below. Accordingly, an aspect of the present invention is to provide a resource allocation method and apparatus for maximizing the total data rate of a system in a multi-user Orthogonal Frequency Division Multiplexing (OFDM) system.

Another aspect of the present invention is to provide a subcarrier and power allocation method and apparatus for maximizing the total data rate of a system while satisfying a required inter-user transmission ratio in a multi-user OFDM system.

Yet another aspect of the present invention is to provide a resource allocation method and apparatus for maximizing the total data rate of a system while satisfying a required inter-user transmission ratio in a multi-user OFDM system based on a multi-frame environment.

In accordance with an aspect of the present invention, a method for allocating resources by a Base Station (BS) apparatus in a wireless communication system is provided. The method includes receiving users' required rates and channel state information from a plurality of user terminals, setting a required inter-user transmission ratio and a number of multi-frames based on information about the users' required rates, allocating a subcarrier and transmit power to each user terminal based on the channel state information and the required inter-user transmission ratio for a period corresponding to the set number of multi-frames, and redistributing the transmit power allocated to the subcarrier.

In accordance with another aspect of the present invention, a BS apparatus for allocating resources in a wireless communication system is provided. The BS apparatus includes a receiver for receiving users' required rates and channel state information from a plurality of user terminals, a subcarrier and power allocator for setting a required inter-user transmission ratio and a number of multi-frames based on information about the users' required rates, for allocating a subcarrier and transmit power to each user terminal based on the channel state information and the required inter-user transmission ratio for a period corresponding to the set number of multi-frames, and for redistributing the transmit power allocated to the subcarrier, and a subcarrier and power mapper for mapping a subcarrier and power to each user data depending on resource allocation information output from the subcarrier and power allocator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
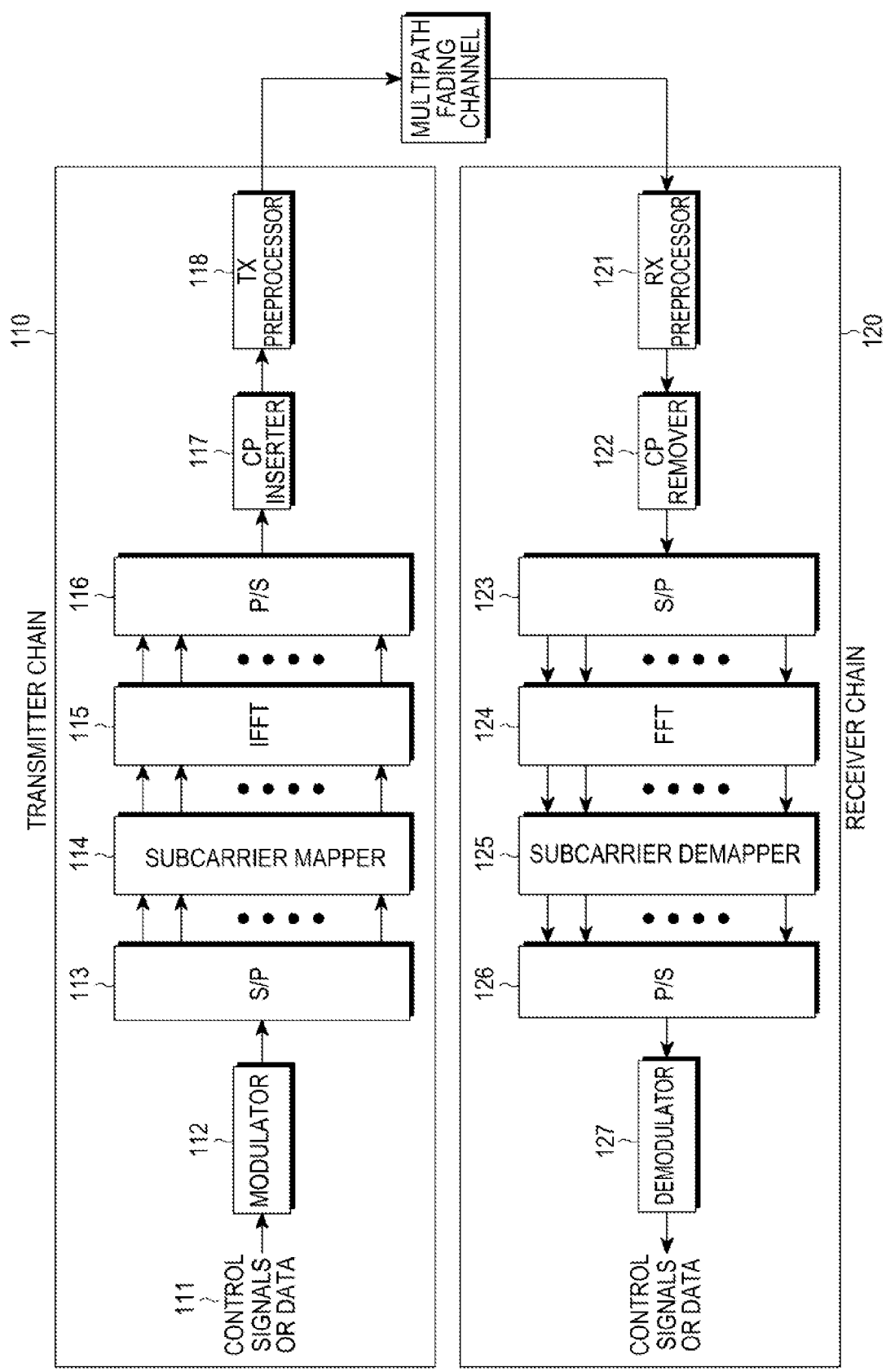
FIG. 1 is a diagram illustrating an Orthogonal Frequency Division Multiplexing (OFDM) transceiver chain according to the related art.
Figure 2:
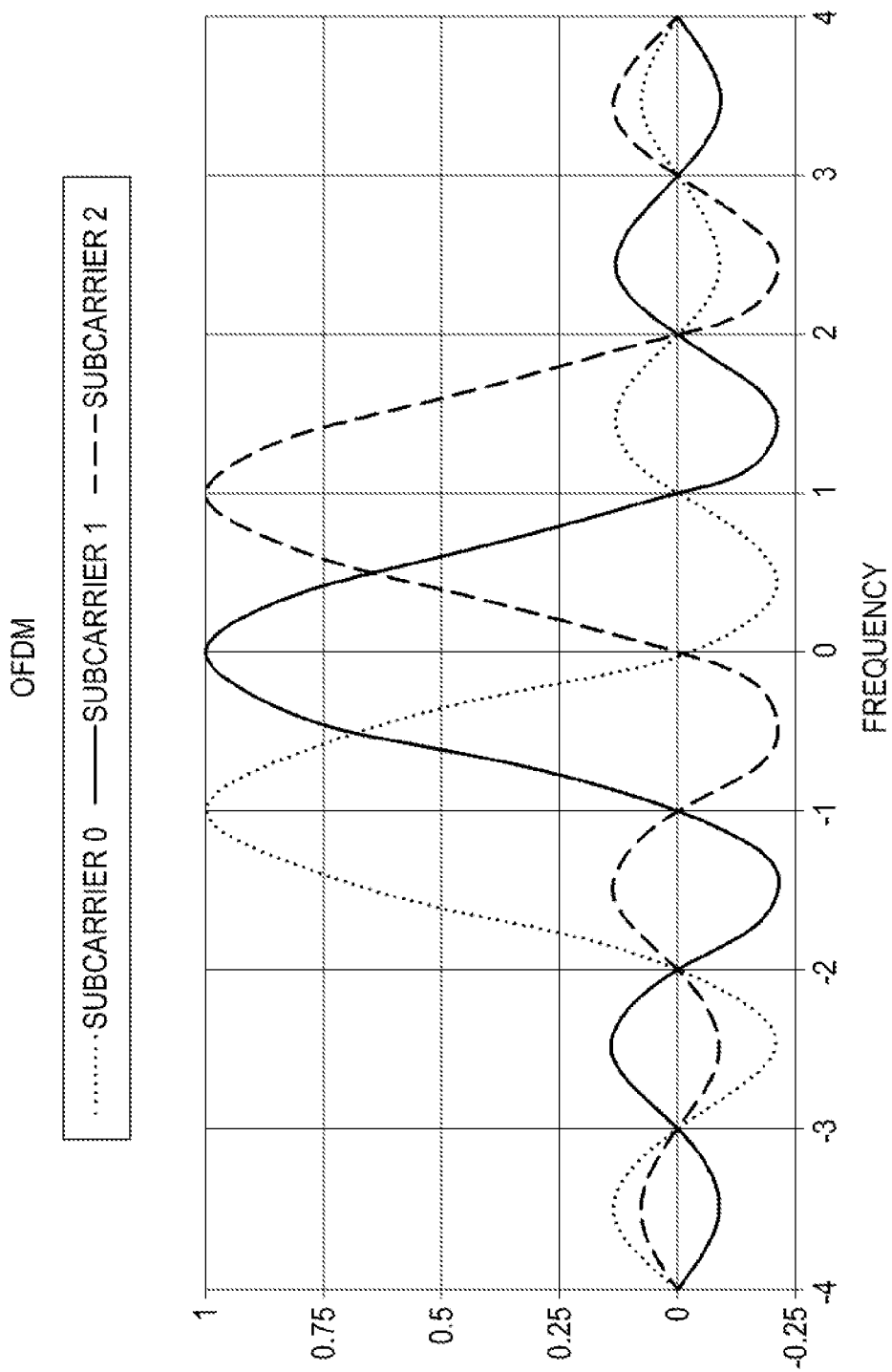
FIG. 2 is a diagram illustrating an example of an OFDM transmission scheme using a first subcarrier, a second subcarrier, and a third subcarrier according to the related art.
Figure 3:
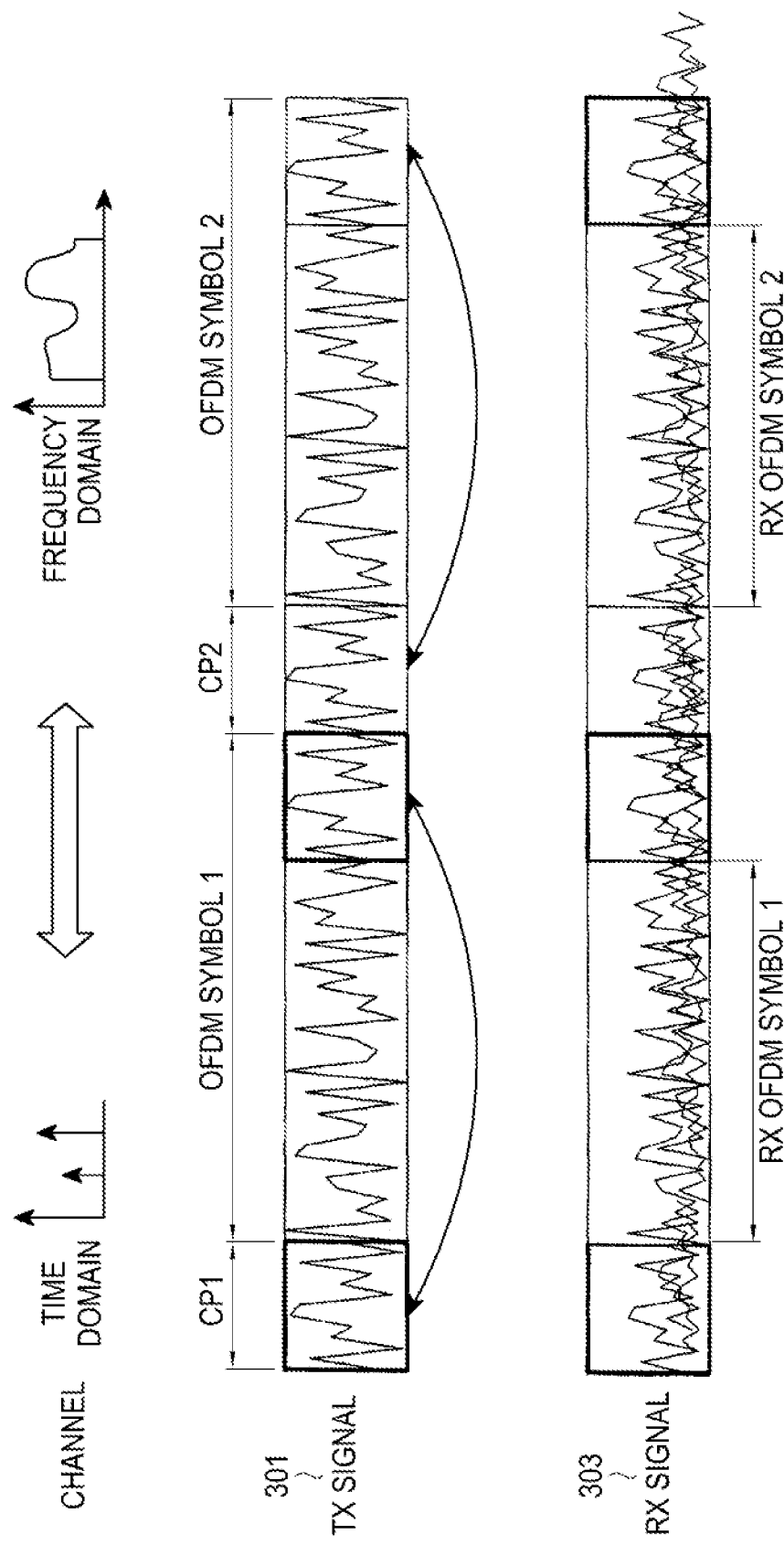
FIG. 3 is a diagram illustrating examples of OFDM symbols transmitted/received in a time domain according to the related art.

The following description with reference to the accompanying drawings is provided to assist in a comprehensive understanding of exemplary embodiments of the invention as defined by the claims and their equivalents. It includes various specific details to assist that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention is directed to an adaptive resource allocation method in a multi-user Orthogonal Frequency Division Multiplexing (OFDM) system. While the multi-user OFDM system includes multi-frames (in a multi-frame environment), the conventional resource allocation scheme includes a scheme satisfying a required inter-user transmission ratio in a single-frame environment. An advantage of this conventional resource allocation scheme is that it may obtain multi-user diversity effect in the single-frame environment, and may satisfy a required inter-user transmission ratio in every frame.

However, the conventional resource allocation scheme suffers from a decrease in the total data rate of the system because it cannot obtain diversity effect of the multi-frame environment. For example, a user having a poor channel state in the current frame may have a good channel state in the next frame. However, the conventional resource allocation scheme considers the current frame and thus satisfies a required transmission ratio of a user having a poor channel state in the current frame, leading to a decrease in the total data rate of the system. In addition, the conventional resource allocation scheme is disadvantageous in that it may be applied only at a high average Signal to Noise Ratio (SNR).

Therefore, in an exemplary embodiment of the present invention, resources are allocated considering a required inter-user transmission ratio in a multi-user OFDM system based on the multi-frame environment, to maximize the total data rate of the system.

A resource allocation method according to an exemplary embodiment of the present invention may roughly include setting a required inter-user transmission ratio, allocating a subcarrier and transmit power, and redirecting the transmit power allocated to a subcarrier.

An exemplary embodiment of the present invention will be described below in detail with reference to accompanying drawings.

Figure 4:
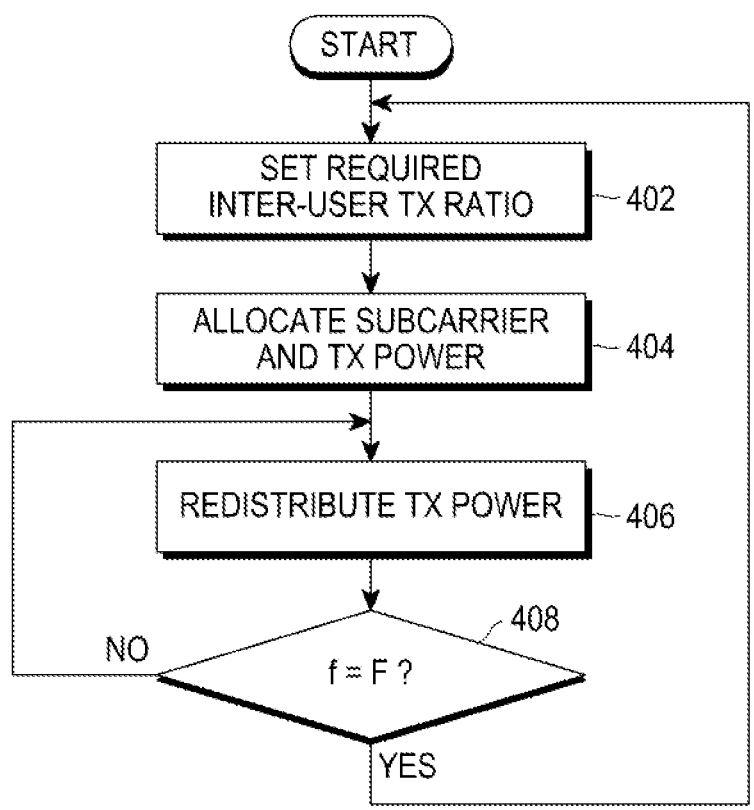
FIG. 4 is a flowchart of a resource allocation method according to an exemplary embodiment of the present invention.

FIG. 4 illustrates a flowchart of a resource allocation method according to an exemplary embodiment of the present invention.

Referring to FIG. 4, a target required inter-user transmission ratio for all user terminals having accessed a multi-user OFDM system is set in step 402. The required inter-user transmission ratio may be previously determined in the OFDM system depending on information about the rates actually required by users. Further, the OFDM system sets the number F of multi-frames, required to satisfy the required inter-user transmission ratio.

In step 404, the OFDM system receives current channel state information from all user terminals in every frame f (1≤f≤F), and allocates subcarriers so as to maximize the total data rate of the system, taking into account the current channel state information and the required inter-user transmission ratio.

To determine a transmission capacity available with subcarriers allocated to user terminals, the OFDM system considers that the total transmit power is uniformly distributed to all subcarriers. Accordingly, the power distributed to a subcarrier allocated to each user terminal can be determined.

Meanwhile, it will be understood by those of ordinary skill in the art that the OFDM system may acquire channel state information from the user terminals in real time, or acquire the channel state information by estimating the current channel states from the previously measured channel states.

In step 406, the powers allocated to the subcarriers are redistributed so that an error between the required inter-user transmission ratio and the actual inter-user transmission ratio may not exceed a specific allowable error range.

In step 408, it is determined whether the current frame f is the last frame F. If it is determined in step 408 that the current frame f is not the last frame, the power redistribution is repeated in step 406. More specifically, the power redistribution is repeated as many times as the number F of multi-frames, which is set in step 402.

However, if the current frame is the last frame (f=F), step 402 and its succeeding steps are repeated to perform a required inter-user transmission ratio setting process and a resource allocation process. The resource allocation process may be repeated or re-performed at preset periods, or for a period in which there are any users having accessed the OFDM system because of a specific event.

Through the above procedure, exemplary embodiments of the present invention may maximize the total data rate of a system by allocating resources taking into account a required inter-user transmission ratio in a multi-user OFDM system based on the multi-frame environment.

A more detailed explanation of operations in steps 402 and 404 will be described below with reference to accompanying drawings.

Figure 5:
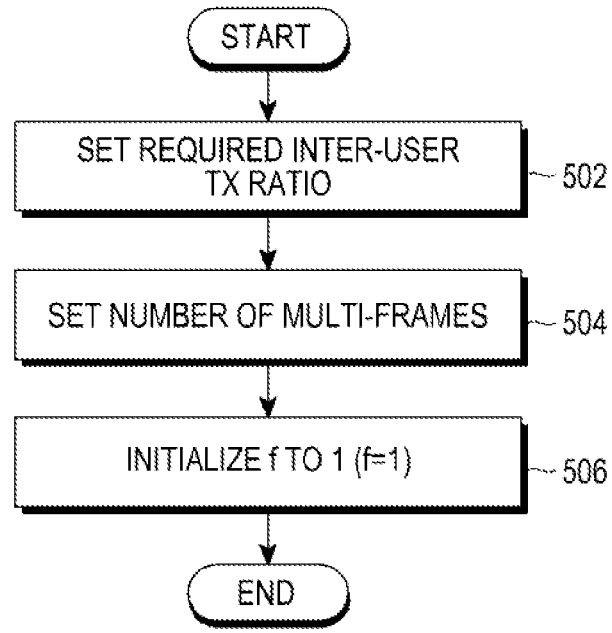
FIG. 5 is a flowchart of a method for setting a required inter-user transmission ratio according to an exemplary embodiment of the present invention.

FIG. 5 is a flowchart of a method for setting a required inter-user transmission ratio according to an exemplary embodiment of the present invention.

Referring to FIG. 5, target required inter-user transmission ratios $\phi 1:\phi 2: \ldots :\phi K$ for all user terminals having accessed the multi-user OFDM system are set in step 502. The required inter-user transmission ratios may be determined in advance in the OFDM system based on information about the transmission capacities actually required by the user terminals of users.

Assuming that the number of users having accessed the OFDM system is K and the total number of subcarriers allocated to the system is N, each actual inter-user transmission ratio can be determined in the following manner.

A transmission capacity $r_{k,f}$(bits/s/Hz) that a user k (1≤k≤K) can acquire in a frame #f (1≤f≤F), is determined using Equation (1) below.

$$r_{k,f} = \sum_{n=1}^{N} \frac{\rho_{k,n,f}}{N} \log_2(1 + p_{k,n,f} H_{k,n,f}) \qquad (1)$$

where $p_{k,n,f}$ represents transmit power allocated to a subcarrier n (1≤n≤N) for a user k in a frame f, $H_{k,n,f}$ represents an SNR that a user k has at a subcarrier n in a frame f, and $\rho_{k,n,f}$ represents an indicator indicating where a user k is allocated a subcarrier n in a frame f.

The SNR is defined as $H_{k,n,f}=(h_{k,n,f}^2/N_0(B/N))$, where $h_{k,n,f}$ represents a channel gain, $N_0$ represents Additional White Gaussian Noise (AWGN), and B represents a channel bandwidth.

If a subcarrier n is allocated to a user k in a frame f, $\rho_{k,n,f}$ can be set to 1, and for the other users, $\rho_{k,n,f}$ is set to 0 to indicate non-allocation of the subcarrier.

If a Bit Error Rate (BER) is considered in Equation (1), Equation (1) can be re-written as Equation (2) below.

$$r_{k,f} = \sum_{n=1}^{N} \frac{\rho_{k,n,f}}{N} \log_2\left(1 + \frac{p_{k,n,f} H_{k,n,f}}{\Gamma_{k,f}}\right) \qquad (2)$$

where $\Gamma_{k,f}$ represents an SNR gap of $\Gamma_{k,f}=[Q^{-1}(BER_{k,f}/4]^2/3$, $Q^{-1}$ represents an inverse function of a Q function, and $BER_{k,f}$ represents a target BER for a user k in a frame f.

Using Equation (1) or (2), the OFDM system can determine actual inter-user transmission ratios $\Sigma_{c=1}^{f} r_{1,c} : \Sigma_{c=1}^{f} r_{2,c} : \ldots : \Sigma_{c=1}^{f} r_{K,c}$ for the first frame (f=1) up to the current frame f.

In step 504, the OFDM system sets the number F of multi-frames, required to satisfy the required inter-user transmission ratios. The number of multi-frames can be set in advance by the OFDM system based on various experiments and simulations.

In step 506, a frame index f is initialized to 1. Thus, the frame index f can increase up to f=F indicative of the last frame one by one, starting with f=1 indicative of the first frame, and subcarrier allocation and power redistribution can be performed on all frames.

Figure 6:
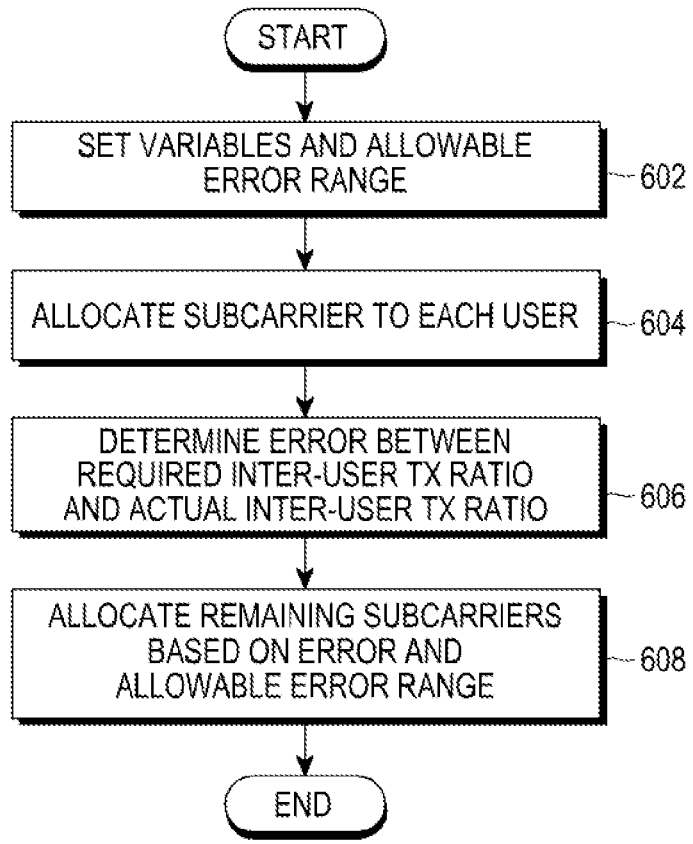
FIG. 6 is a flowchart of a subcarrier and power allocation process according to an exemplary embodiment of the present invention.

FIG. 6 is a flowchart of a subcarrier and power allocation process according to an exemplary embodiment of the present invention.

Referring to FIG. 6, the OFDM system initializes variables for subcarrier allocation and power allocation in step 602.

That is, a variable $\Theta$ is defined as an unallocated subcarrier, and a variable $\Omega_k$ is defined as a subcarrier allocated to a user k. An allowable error range ψ(k, f) between a required transmission ratio and an actual transmission ratio for each user k is determined in each frame.

The allowable error range, which is previously set by the OFDM system, may have a different value for each user and each frame. While the allowable error range is set in accordance with Equation (3) below in an exemplary embodiment of the present invention, it is apparent to those of ordinary skill in the art that the allowable error range may be set by other methods.

$$\psi(k, f) = \varepsilon_k + (F - f)\frac{1}{F}\min\left(\phi_k \bigg/ \sum_{k=1}^{K} \phi_k\right) \quad (3)$$

where $\varepsilon_k$ represents a final error range (i.e., an error range in the last frame F) for a user k.

In step 604, the OFDM system allocates a subcarrier and a transmit power to each user. The subcarrier and transmit power may be allocated by the following algorithm.

---
{For $\tilde{k}$ = 1 to K
    Find $\tilde{n}$ = arg $\max_{n \in \Theta}$ H$_{\tilde{k},n,f}$
    Allocate subcarrier $\tilde{n}$ for user $\tilde{k}$ as $\rho_{\tilde{k},\tilde{n},f}$ = 1
    Update $\Omega_{\tilde{k}}$ = $\Omega_{\tilde{k}}$ + {$\tilde{n}$}
    Allocate power p$_{\tilde{k},\tilde{n},f}$ = P$_T$/N
    Calculate r$_{\tilde{k},f}$ using [figure 1]
    Extract allocated subcarrier $\Theta$ = $\Theta$ − {$\tilde{n}$}
End}
---

That is, the OFDM system allocates one $$\tilde{n} = \operatorname*{argmax}_{n \in \Theta} H_{\tilde{k},n,f}$$

having the best channel state to each user. The allocated subcarrier is not allocated to other users.

With the total transmit power of the system defined as $P_T$, transmit power is allocated to a subcarrier allocated to each user on the assumption that the total transmit power $P_T$ is uniformly distributed to all subcarriers. Therefore, power distributed to a subcarrier allocated to each user is determined by dividing the total transmit power $P_T$ by the total number of subcarriers.

If the subcarrier and transmit power are allocated, the OFDM system determines a transmission capacity $r_{\tilde{k},f}$ for each user.

In steps 606 and 608, the OFDM system allocates the remaining subcarriers and transmit power to other users.

To this end, in an exemplary embodiment of the present invention, an error between a required transmission ratio and an actual transmission ratio for a user k, and the allowable error range are used. The error between a required transmission ratio and an actual transmission ratio for a user k can be represented by one of the following two expressions. One is an error that can be represented when the system provides a transmission ratio greater than a required transmission ratio of a user k, and this error is expressed as $E_{k,f}^O$ ($0 < E_{k,f}^O < 1$), and can be determined using Equation (4) below.

$$E_{k,f}^O = \frac{\sum_{c=1}^{f} r_{k,c}}{\sum_{k=1}^{K}\sum_{c=1}^{f} r_{k,c}} - \frac{\phi_k}{\sum_{k=1}^{K} \phi_k} \quad (4)$$

Another is an error that can be represented when the system provides a transmission ratio less than a required transmission ratio of a user k, and this error is expressed as $E_{k,f}^U$ ($0 \le E_{k,f}^U < 1$), and can be determined using Equation (5) below.

$$E_{k,f}^U = \frac{\phi_k}{\sum_{k=1}^{K} \phi_k} - \frac{\sum_{c=1}^{f} r_{k,c}}{\sum_{k=1}^{K}\sum_{c=1}^{f} r_{k,c}} \quad (5)$$

Each user always has one of $E_{k,f}^O$ and $E_{k,f}^U$ and cannot have both of them at the same time. Each user has $E_{k,f}^O$ or $E_{k,f}^U$ depending on the subcarrier and the transmit power allocated and distributed thereto.

The remaining subcarriers and power may be allocated by the following algorithm using the error and the allowable error range. The allocation is repeated until all of the remaining subcarriers are allocated out.

---
{While ($\Theta \neq \emptyset$)
    Update $E_{k,f}^O$ using [figure 4] and $E_{k,f}^U$ using [figure 5]
    Find user group 1 as G1 = {user k who satisfies $E_{k,f}^U > \psi_{k,f}$}
    If (G1 $\neq \emptyset$)
        Find user $\tilde{k}$ = arg max $E_{k,f}^U$
        Find subcarrier $\tilde{n}$ = arg $\max_{n \in \Theta}$ H$_{\tilde{k},n,f}$
    Else
        Find user group 2 as G1 = {user k who satisfies $E_{k,f}^O \ge 0$}
        Find user and subcarrier $\tilde{k}$, $\tilde{n}$ = arg $\max_{\{k \in G_2, n \in \Theta\}}$ H$_{k,n,f}$
    End If
    Allocate subcarrier $\tilde{n}$ for user $\tilde{k}$ as $\rho_{\tilde{k},\tilde{n},f}$ = 1
    Update $\Omega_{\tilde{k}}$ = $\Omega_{\tilde{k}}$ + {$\tilde{n}$}
    Allocate power p$_{\tilde{k},\tilde{n},f}$ = P$_T$/N
    Calculate r$_{\tilde{k},f}$ using [figure 1]
    Extract allocated subcarrier $\Theta$ = $\Theta$ − {$\tilde{n}$}
End While}
---

That is, in step 606, the OFDM system determines $E_{k,f}^O$ or $E_{k,f}^U$ for respective users, using Equation (4) or (5).

In step 608, the OFDM system detects a first user group G1 of users whose errors $E_{k,f}^U$ exceed a preset allowable error range $\psi_{k,f}$ among the users whose actual transmission ratios are less than their required transmission ratios.

If the first user group G1 exists, the OFDM system finds a user having the largest error value $E_{k,f}^U$ among the users in the first user group G1, and finds a subcarrier having the best channel state among the remaining subcarriers, for the user.

In the absence of the first user group G1, the OFDM system detects a second user group G2 (with $E_{k,f}^U \ge 0$) of users whose actual transmission ratios are less than their required transmission ratios. The OFDM system finds a subcarrier having the best channel state and its associated user among the users in the second user group G2.

The OFDM system allocates associated subcarriers to the users found through the above process, and the allocated subcarriers are not allocated to the other users.

The OFDM system uniformly distributes transmit power to the subcarriers allocated to the users. If the subcarriers and transmit power are allocated, the OFDM system updates transmission capacities $r_{k,f}$ of the users independently.

The above process is repeated, and if all of the remaining subcarriers are allocated to the users, the process is ended.

Figure 7:
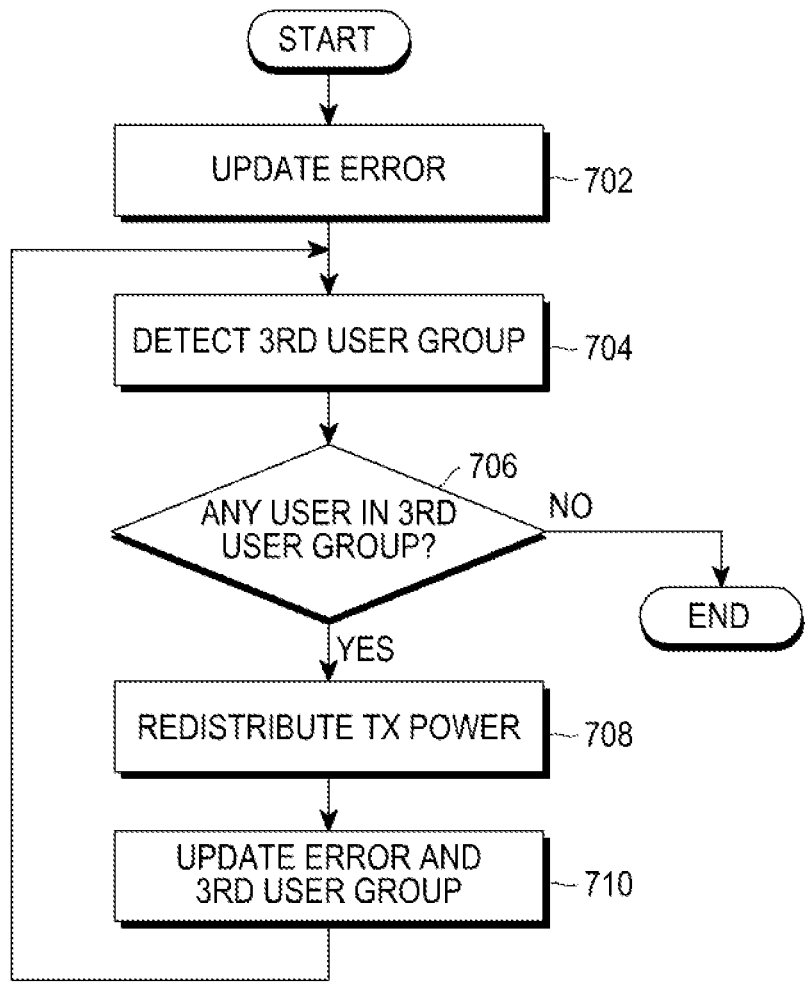
FIG. 7 is a flowchart of a process of redistributing power allocated to subcarriers according to an exemplary embodiment of the present invention.

FIG. 7 is a flowchart of a process of redistributing power allocated to subcarriers according to an exemplary embodiment of the present invention.

Referring to FIG. 7, the OFDM system updates an error between a required transmission ratio and an actual transmission ratio for each user in step 702. That is, if the allocation of a subcarrier and transmit power for each user are completed, an error $E_{k,f}^O$ or $E_{k,f}^U$ between a required transmission ratio and an actual transmission ratio for a user k is updated for each user.

In step 704, the OFDM system detects a third user group G3 (with $E_{k,f}^O > 0$) of users whose actual transmission ratios are greater than their required transmission ratios.

In steps 706 and 708, the OFDM system redistributes the transmit power allocated to the subcarrier for each user. That is, the actual inter-user transmission ratios may satisfy the required inter-user transmission ratios by redistributing the transmit power of the users in the third user group G3 to the users whose actual transmission ratios are less than their required transmission ratios.

The transmit power may be redistributed by the following algorithm.

```
{While (E_{k,f}^O > ψ_{k,f} or E_{k,f}^U > ψ_{k,f})
  For each user k̃ in group G3
      Find subcarrier ñ = arg max_{n∈Ω_k} p_{k̃,n,f}
      If (p_{k̃,n,f} < Δp)
         Extract the user k̃ from G3 as G_3 = G_3 - {k̃}
      End if
  End for
  If (G3 = ∅)
      Break;
  Else
      Find user i = arg max_{k∈G_3} E_{k,f}^O
      Find user j = arg max E_{k,f}^U
      Find subcarrier l = arg min_{{n∈Ω_i, p_{i,n,j} ≥ □p}} H_{i,n,f}
      Find subcarrier m = arg max_{{n∈Ω_j, p_{j,n,j} ≥ □p}} H_{j,n,f}
      Update p_{i,l,f} = p_{i,l,f} - Δp
      Update p_{j,m,f} = p_{j,m,f} + Δp
      Calculate r_{i,f} and r_{j,f} using [figure 1]
      Update E_{k,f}^O using [figure 4] and E_{k,f}^U using [figure 5]
      Update user group 3 as G3 = {user k who satisfies E_{k,f}^O > 0}
  End if
End while}
```

That is, in step 704, the OFDM system detects the third user group G3 with $E_{k,f}^O > 0$, and detects a subcarrier that is distributed with the highest transmit power, among the subcarriers allocated to associated users with respect to the users in the third user group G3.

If the transmit power distributed to the detected subcarrier is less than a transmit power redistribution unit Δp, its associated user is excluded from the third user group G3 because there is no more power to be redistributed. The transmit power redistribution unit Δp is much less than the total transmit power $P_T$ of the system.

If it is determined that there is no user in the third user group G3 in step 706, the power redistribution is ended because there are no more users that can be redistributed transmit power. However, if it is determined that there are users in the third user group G3 in step 706, the OFDM system proceeds to step 708.

In step 708, the OFDM system detects a user i whose actual transmission ratio is greater than its required transmission ratio and a user j whose actual transmission ratio is less than its required transmission ratio, from among the users in the third user group G3.

Upon detecting the user i, the OFDM system detects a subcarrier l having the worst channel state for the user, from among the subcarriers, which are allocated to the user i, and distributed transmit powers that are greater than the transmit power redistribution unit Δp.

Upon detecting the user j, the OFDM system detects a subcarrier m having the best channel state for the user among the subcarriers allocated to the user j.

If the detection of the subcarriers l and m is completed, the OFDM system reduces the transmit power distributed to the subcarrier l for the user i by the transmit power redistribution unit Δp, and redistributes the reduced transmit power to the subcarrier m for the user j. Due to the redistribution of transmit power, transmission capacities of the users i and j are different from the previous transmission capacities.

In step 710, the OFDM system updates the current transmission capacities of the users i and j. If the transmission capacities are updated, $E_{k,f}^O$ or $E_{k,f}^U$ of each user is updated using Equation (4) or (5). In addition, the OFDM system updates the third user group G3 (with $E_{k,f}^O > 0$) of users whose actual transmission ratios are greater than their required transmission ratios.

The power redistribution is continuously repeated until an error between a required transmission ratio and an actual transmission ratio for every user k does not exceed the allowable error range.

As described above, the resource allocation method according to an exemplary embodiment of the present invention includes setting a required inter-user transmission ratio and the number of multi-frames, allocating a subcarrier and transmit power to each user for a period corresponding to the number of multi-frames, and redistributing the transmit power allocated to the subcarrier, on a repeated basis.

By allocating subcarriers and transmit power according to the above resource allocation method, the present invention may maximize the total data rate of a system while satisfying the required inter-user transmission ratio in a multi-user OFDM system based on the multi-frame environment.

Figure 8:
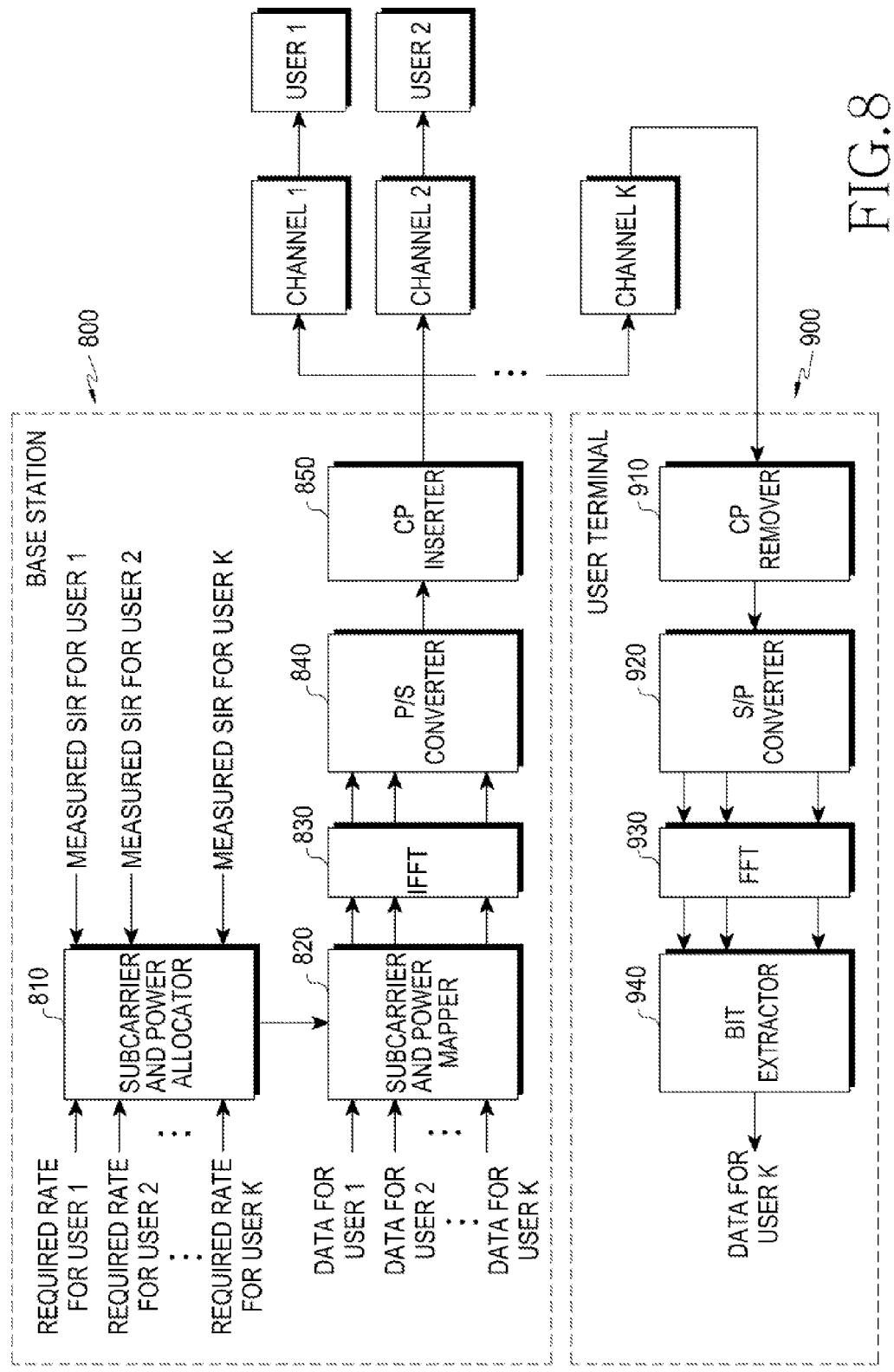
FIG. 8 is a diagram illustrating a transceiver chain in a multi-user OFDM system according to an exemplary embodiment of the present invention.

FIG. 8 is a diagram illustrating a transceiver chain in a multi-user OFDM system according to an exemplary embodiment of the present invention.

Referring to FIG. 8, a Base Station (BS) apparatus 800 includes a subcarrier and power allocator 810, a subcarrier and power mapper 820, an Inverse Fast Fourier Transform (IFFT) unit 830, a Parallel-to-Serial (P/S) converter 840, and a CP inserter 850. A user terminal 900 includes a CP remover 910, a Serial-to-Parallel (S/P) converter 920, a Fast Fourier Transform (FFT) unit 930, and a bit extractor 940. Other components of the BS apparatus 800 and the user terminal 900, which are not immediately applicable to the subject matter of the present invention, are not considered for simplicity.

The resource allocation method according to an exemplary embodiment of the present invention may be performed by the subcarrier and power allocator 810 and the subcarrier and power mapper 820 in the BS apparatus 800.

To be more specific, the subcarrier and power allocator 810 sets a target required inter-user transmission ratio based on information about a required rate of each user. In addition, the subcarrier and power allocator 810 sets the number F of multi-frames, required to satisfy the required inter-user transmission ratio.

The subcarrier and power allocator 810 receives the current channel state information (or measured Signal-to-Interference Ratios (SIRs)) from all user terminals in every frame f (1≤f≤F), and allocates subcarriers so as to maximize the total data rate of the system, taking into account the channel state information and the required inter-user transmission ratio. The subcarrier and power allocator 810 allocates transmit power to the subcarrier allocated each user terminal on the assumption that the total transmit power is uniformly distributed to all subcarriers.

Thereafter, the subcarrier and power allocator 810 redistributes the power allocated to the subcarriers so that an error between the required inter-user transmission ratio and the actual inter-user transmission ratio may not exceed an allowable error range.

The subcarrier and power allocator 810 may allocate resources by repeatedly performing the subcarrier allocation and power redistribution process on all frames F.

The subcarrier and power mapper 820 maps a subcarrier and power to each user data based on the value output from the subcarrier and power allocator 810, and outputs the mapped data to the IFFT unit 830.

Through the operation of the BS apparatus 800, exemplary embodiments of the present invention can maximize the total data rate of a system by allocating resources considering the required inter-user transmission ratio in a multi-user OFDM system based on the multi-frame environment.

Figure 9:
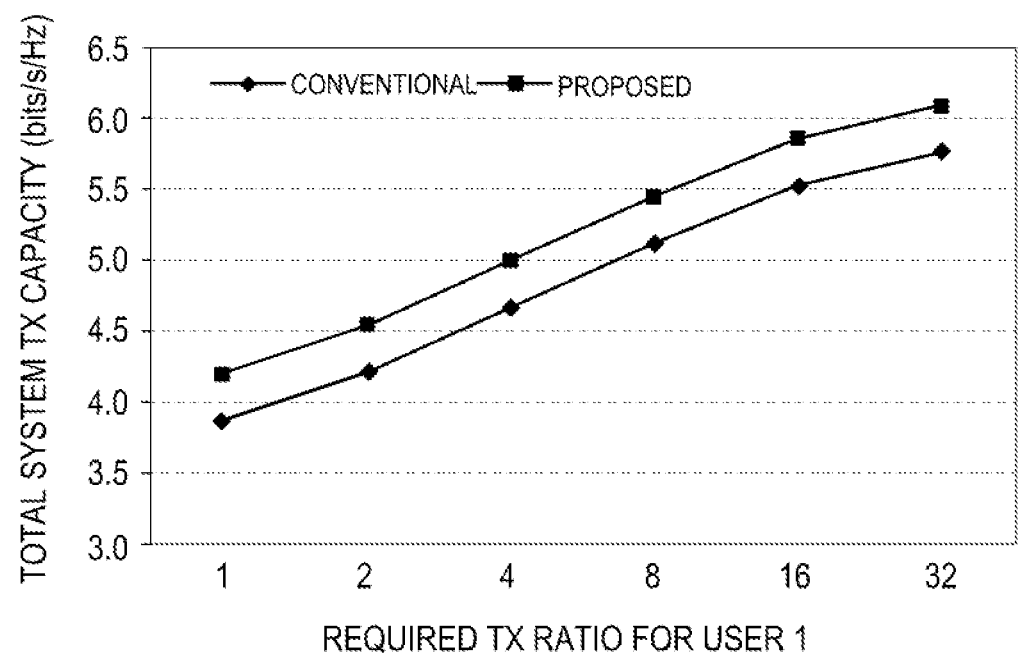
FIG. 9 is a diagram illustrating simulation results for the total transmission capacity of a system according to an exemplary embodiment of the present invention.

FIG. 9 is a diagram illustrating simulation results for the total transmission capacity of a system according to an exemplary embodiment of the present invention.

Referring to FIG. 9, it can be understood that a method according to an exemplary embodiment of the present invention increases the total data rate of the system, compared to the conventional method. For example, it is noted that for a user's required transmission ratio of 2, the total system transmission capacity according to the conventional method is 4.20 bits/s/Hz, whereas the total system transmission capacity according to the present invention is 4.54 bits/s/Hz.

Figure 10:
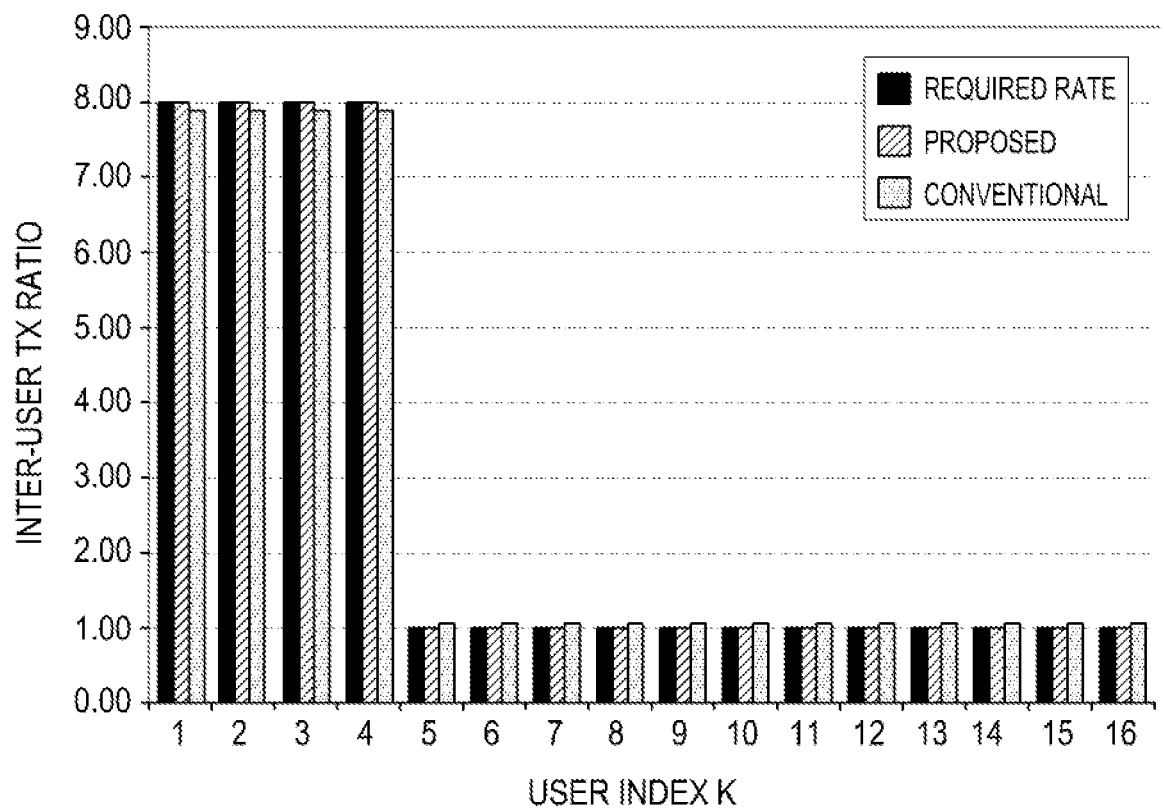
FIG. 10 is a diagram illustrating simulation results for satisfaction of a required inter-user transmission ratio according to an exemplary embodiment of the present invention.

FIG. 10 is a diagram illustrating simulation results for satisfaction of a required inter-user transmission ratio according to an exemplary embodiment of the present invention.

Referring to FIG. 10, it can be understood that the resource allocation method according to an exemplary embodiment of the present invention accurately satisfies required inter-user transmission ratios, compared with the conventional method. For example, as to transmission ratios $\phi 1:\phi 2:\ldots:\phi K$ required by 16 users, the transmission ratios of users #1 to #4 are 8, and the transmission ratios of the other users are 1. That is, $\phi 1:\phi 2:\ldots:\phi K=8:8:8:8:1:1:\ldots:1$. It can be noted that for a user index of 2, the resource allocation method according to the present invention satisfies the required inter-user transmission ratio at 8.00003, whereas the conventional method satisfies the required inter-user transmission ratio at 7.87839.

In conclusion, the resource allocation method according to an exemplary embodiment of the present invention efficiently allocates subcarriers and transmission power in a multi-user OFDM system based on the multi-frame environment, thereby improving the total transmission capacity of the system and more accurately satisfying the required inter-user transmission ratios, compared with the conventional resource allocation method.

As is apparent from the foregoing description, exemplary embodiments of the present invention can provide multi-user diversity effects in the multi-frame environment. In addition, exemplary embodiments of the present invention can maximize the total data rate of a system while satisfying the required inter-user transmission ratios in a multi-user OFDM system based on the multi-frame environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating resources by a Base Station (BS) apparatus in a wireless communication system, the method comprising:

receiving users' required rates and channel state information from a plurality of user terminals;

setting a required inter-user transmission ratio and a number of multi-frames based on information about the users' required rates;

allocating a subcarrier and transmit power to each user terminal based on the channel state information and the required inter-user transmission ratio for a period corresponding to the set number of multi-frames; and redistributing the transmit power allocated to the subcarrier.

2. The method of claim 1, wherein the setting of the required inter-user transmission ratio comprises: setting the number of multi-frames required to satisfy the required inter-user transmission ratio; and initializing an index of a multi-frame to 1.

3. The method of claim 1, wherein the allocating of the transmit power comprises determining an allowable error range for an error between the required inter-user transmission ratio and an actual inter-user transmission ratio.

4. The method of claim 3, wherein the allowable error range is determined by, $$\psi(k, f) = \varepsilon_k + (F-f)\frac{1}{F}\min\left(\phi_k \bigg/ \sum_{k=1}^{K}\phi_k\right)$$

where k represents a user terminal, f represents a frame index, F represents a number of multi-frames, $\epsilon_k$ represents a final error range for a user k, and $\phi_k$ represents a required rate for a user k.

5. The method of claim 3, wherein the allocating of the transmit power comprises determining an error between the required inter-user transmission ratio and the actual inter-user transmission ratio.

6. The method of claim 5, wherein the error is determined by, $$E_{k,f}^O = \frac{\sum_{c=1}^{f} r_{k,c}}{\sum_{k=1}^{K}\sum_{c=1}^{f} r_{k,c}} - \frac{\phi_k}{\sum_{k=1}^{K}\phi_k} \text{ or}$$

-continued $$E_{k,f}^U = \frac{\phi_k}{\sum_{k=1}^{K} \phi_k} - \frac{\sum_{c=1}^{f} r_{k,c}}{\sum_{k=1}^{K} \sum_{c=1}^{f} r_{k,c}}$$

where $\phi_k$ represents a required rate for a user k, and $r_{k,c}$ represents an actual rate for a user k in a frame c.

7. The method of claim 6, wherein the error is determined by $$E_{k,f}^O = \frac{\sum_{c=1}^{f} r_{k,c}}{\sum_{k=1}^{K} \sum_{c=1}^{f} r_{k,c}} - \frac{\phi_k}{\sum_{k=1}^{K} \phi_k}$$

if a transmission ratio greater than a required transmission ratio of a user k is provided.

8. The method of claim 6, wherein the error is determined by $$E_{k,f}^U = \frac{\phi_k}{\sum_{k=1}^{K} \phi_k} - \frac{\sum_{c=1}^{f} r_{k,c}}{\sum_{k=1}^{K} \sum_{c=1}^{f} r_{k,c}}$$

if a transmission ratio less than a required transmission ratio of a user k is provided.

9. The method of claim 5, wherein the allocating of the transmit power comprises allocating a subcarrier and transmit power to each user terminal based on the error and the allowable error range.

10. The method of claim 9, wherein the redistributing of the transmit power comprises:
   detecting a specific user group based on the error;
   redistributing transmit power allocated to a user in the user group, to another user terminal; and
   updating the error and the user group, and repeating the redistribution until there is no user in the updated user group.

11. The method of claim 1, wherein the allocating and the redistributing are repeatedly performed for the period corresponding to the number of multi-frames.

12. A Base Station (BS) apparatus for allocating resources in a wireless communication system, the BS apparatus comprising:
   a receiver for receiving users' required rates and channel state information from a plurality of user terminals;
   a subcarrier and power allocator for setting a required inter-user transmission ratio and a number of multi-frames based on information about the users' required rates, for allocating a subcarrier and transmit power to each user terminal based on the channel state information and the required inter-user transmission ratio for a period corresponding to the set number of multi-frames, and for redistributing the transmit power allocated to the subcarrier; and
   a subcarrier and power mapper for mapping a subcarrier and power to each user data depending on resource allocation information output from the subcarrier and power allocator.

13. The BS apparatus of claim 12, wherein the subcarrier and power allocator sets a number of multi-frames, required to satisfy the required inter-user transmission ratio, and satisfies an index of a multi-frame that is set to 1.

14. The BS apparatus of claim 12, wherein the subcarrier and power allocator determines an allowable error range for an error between the required inter-user transmission ratio and an actual inter-user transmission ratio, and determines the error between the required inter-user transmission ratio and the actual inter-user transmission ratio.

15. The BS apparatus of claim 14, wherein the allowable error range is determined by, $$\psi(k, f) = \varepsilon_k + (F - f)\frac{1}{F}\min\left(\phi_k \Big/ \sum_{k=1}^{K} \phi_k\right)$$

where k represents a user terminal, f represents a frame index, F represents a number of multi-frames, $\epsilon_k$ represents a final error range for a user k, and $\phi_k$ represents a required rate for a user k.

16. The BS apparatus of claim 14, wherein the error is determined by, $$E_{k,f}^O = \frac{\sum_{c=1}^{f} r_{k,c}}{\sum_{k=1}^{K} \sum_{c=1}^{f} r_{k,c}} - \frac{\phi_k}{\sum_{k=1}^{K} \phi_k} \text{ or}$$

$$E_{k,f}^U = \frac{\phi_k}{\sum_{k=1}^{K} \phi_k} - \frac{\sum_{c=1}^{f} r_{k,c}}{\sum_{k=1}^{K} \sum_{c=1}^{f} r_{k,c}}$$

where $\phi_k$ represents a required rate for a user k, and $r_{k,c}$ represents an actual rate for a user k in a frame c.

17. The BS apparatus of claim 16, wherein the error is determined by $$E_{k,f}^O = \frac{\sum_{c=1}^{f} r_{k,c}}{\sum_{k=1}^{K} \sum_{c=1}^{f} r_{k,c}} - \frac{\phi_k}{\sum_{k=1}^{K} \phi_k}$$

if a transmission ratio greater than a required transmission ratio of a user k is provided.

18. The BS apparatus of claim 16, wherein the error is determined by $$E_{k,f}^U = \frac{\phi_k}{\sum_{k=1}^{K} \phi_k} - \frac{\sum_{c=1}^{f} r_{k,c}}{\sum_{k=1}^{K} \sum_{c=1}^{f} r_{k,c}}$$

if a transmission ratio less than a required transmission ratio of a user k is provided.

19. The BS apparatus of claim 14, wherein the subcarrier and power allocator allocates a subcarrier and transmit power to each user terminal based on the error and the allowable error range.

20. The BS apparatus of claim 19, wherein the subcarrier and power allocator includes,
  detecting a specific user group, and redistributing transmit power allocated to a user in the detected user group, to another user terminal; and
  updating the error and the user group, and repeating the redistribution until there is no user in the updated user group.

21. The BS apparatus of claim 12, wherein the subcarrier and power allocator repeatedly performs operations of the allocating and the redistributing for the period corresponding to the set number of multi-frames.

* * * * *